Nov. 2, 1965   E. TRONNIER ETAL   3,215,037
COMPACT TELE-OBJECTIVE SUITABLE AS REPLACEMENT OBJECTIVE WITH
CENTRAL SHUTTERS
Filed Dec. 1, 1961
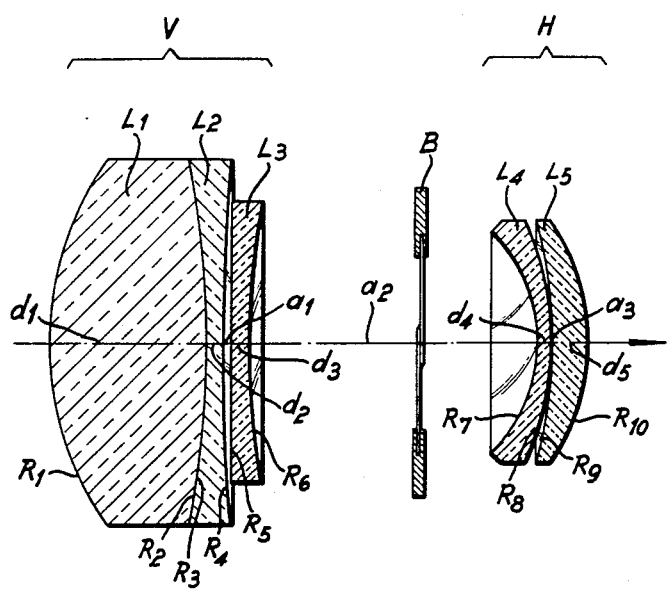
INVENTORS
ERNST TRONNIER + FRIEDRICH UEBERHAGEN
BY
ATTORNEYS 3,215,037
COMPACT TELE-OBJECTIVE SUITABLE AS REPLACEMENT OBJECTIVE WITH CENTRAL SHUTTERS
Ernst Tronnier and Friedrich Ueberhagen, Braunschweig, Germany, assignors to Voigtlander A.G., Braunschweig, Germany, a corporation of Germany
Filed Dec. 1, 1961, Ser. No. 156,250
Claims priority, application Germany, Feb. 24, 1961, V 20,217
6 Claims. (Cl. 88—57)

This invention relates to photographic tele-objectives and, more particularly, to a tele-objective having a relative aperture in excess of 1:4 and particularly adapted for advantageous employment as a replacement objective in conjunction with central shutters and characterized by the lack of any undesirable drop in light intensity toward the edges of the image.

The tele-objective of the present invention is of the general type disclosed in U.S. Patent No. 2,730,017 which latter is directed to a tele-objective including a condensing front member and a negative rear member separated by a relatively large air gap, with the condensing front member comprising a biconvex condensing lens followed, in the direction of light rays from the longer conjugate toward the shorter conjugate, by two adjacent dispersion lenses. In the tele-objective of such patent, the natural focal length of the condensing front lens is from 0.225F to 0.475F, where F is the focal length of the overall objective. The preferably isosceles dispersion lenses define an air gap in the form of a collecting meniscus which is convex to provide a greater width of radiation. The condensing lens of the front member and the dispersion lens immediately rearwardly thereof can be cemented to each other and, by proper distribution of the refractive indices, which have an overcorrective effect, the zonal error within and outside of the optical axis is reduced.

The high intensity tele-objective of the present invention has a front member which is designed in accordance with the front member of the tele-objective of Patent No. 2,730,017. However, the negative rear member has a known type of Gaussian design comprising a dispersing meniscus followed by a condensing meniscus, both of which have their dispersing concave face toward the positive front member. This negative rear member is spaced axially by a relatively large air gap from the front member in the direction of light rays entering the objective to form the image.

This type of design makes it possible to construct a tele-objective having a relative aperture in excess of 1:4, and wherein the diaphragm and the eye piece are shifted to a greater extent, rearwardly in the direction of the image forming light rays, than is the general practice in tele-objectives. Thereby, the entire tele-objective is much more compact, particularly in an axial direction, and can thus be used advantageously as a replacement objective wherein a central shutter is mounted behind the usual objective, and without the disadvantage of an undesirable drop in light intensity, or vignetting, toward the edges of the image.

In order to reduce the normally occurring overcorrection of the sagittal and tangential ray fans toward the edge of the image, and simultaneously to achieve an increase of the meridional coma bundles requisite for the high relative aperture and with respect to the image field portions lying outside the axis, the curvature $\sigma_H$ of the rear member as the quotient of the arithmetical sum and the arithmetical difference of the two outer radii of the rear member should have a value of from 4.5 to 6.5 and, at the same time, the power of the light condensing pair of surfaces between the negative rear meniscus and the positive rear meniscus should have an absolute value between $1.33\Phi$ and $3.33\Phi$, where $\Phi$ is the equivalent power of the overall objective. Furthermore, the curvature $\sigma_L$ of the air gap should lie between 4.5 and 6.5.

For an understanding of the principles of the invention, reference is made to the following detailed description of a typical embodiment thereof as illustrated in the accompanying drawing in which the single figure is a standard representation, on a scale of approximately 2:1, of a tele-objective embodying the invention.

Referring to the drawing, the several lenses or menisci are designated L with appropriate numeral subscripts arranged in ascending order proceeding from the longer conjugate toward the shorter conjugate. Similarly, the axial thicknesses of the several lenses are designated $d$, again with appropriate ascending numerical subscripts arranged in ascending order in the direction from the longer conjugate toward the shorter conjugate. The same is true of the radii R of the several lenses and of the axial air gaps, which are designated $a$. The front member of the tele-objective is generally designated V and the rear member is generally designated H, with the diaphragm being designated B.

Utilizing these designations, the foregoing relationships just expressed may be translated into the following formula:

$$\sigma_H = \frac{R_{10} + R_7}{R_{10} - R_7}$$

(a)          $4.5 < \sigma_H < 6.5$
(b)          $1.33\Phi < \phi_8 < 3.33\Phi$
           $1.33\Phi < \phi_9 < 3.33\Phi$ $$\sigma_L = \frac{R_9 + R_8}{R_9 - R_8}$$

(c)          $4.5 < \sigma_L < 6.5$

In accordance with the present invention, it has been found advantageous to have the difference between the refractive indices ($n_5 - n_4$) of the condensing rear meniscus $L_5$ and of the dispersing rear meniscus $L_4$ range between 0.04 and 0.12. Furthermore, the refractive index $n_5$ should be in excess of 1.72.

To influence the meridional coma and to correct the color magnification error, the axial thickness $d_1$ of the condensing front lens $L_1$ should be from 0.12F to 0.17F, where F is the overall focal length of the tele-objective. While, in the drawing, individual lenses $L_4$ and $L_5$ have been used for the rear member H, it is within the scope of the invention to substitute, for these individual lenses, two or more lenses provided that the power sign and the meniscus shape are retained.

The following table gives the structural data for a tele-objective embodying the invention, having a focal length $F=100$ with a relative aperture of 1:3.4, an image angle of ±15°, and an intercept length on the image side of 43.35 mm.

|  |  | Refractive Index $n$ | Abbe Number $\nu$ | Power $\phi$ as factor of equivalent total power $\Phi$ |
|---|---|---|---|---|
| $R_1=+30.72$ | $d_1=15.38$ (cemented) | 1.6700 | 47.2 | $+2.181$ |
| $R_2=-103.96$ | | | | $+0.645$ |
| $R_3=-103.96$ | $d_2=1.65$ | 1.7847 | 25.7 | $-0.755$ |
| $R_4=+261.61$ | | | | $-0.300$ |
| $R_5=+803.87$ | $a_1=0.57$ $d_3=1.65$ | 1.0852 | 25.5 | $+0.100$ |
| $R_6=+79.48$ | | | | $-1.013$ |
| $R_7=-14.21$ | $a_2=28.39$ $d_4=0.91$ | 1.6700 | 39.2 | $-4.716$ |
| $R_8=-31.85$ | | | | $+2.103$ |
| $R_9=-45.70$ | $a_3=0.11$ $d_5=3.30$ | 1.7495 | 35.0 | $-1.640$ |
| $R_{10}=-20.30$ | | | | $+3.692$ |

The front member V includes a condensing or biconvex front lens $L_1$ followed by dispersion lenses $L_2$ and $L_3$, with lens $L_2$ being cemented to lens $L_1$ to form an interface therewith. The focal length of lens $L_1$ is 0.359F, and is thus within the range of 0.225F to 0.475F as set forth in Patent No. 2,730,017. The air gap $a_2$ separating the front and rear members is 0.284F, and lies within the range of 0.20F to 0.60F.

The curvature $\sigma_H$ of the rear member H is calculated as follows:

$$\sigma_H = \frac{R_{10}+R_7}{R_{10}-R_7} = 5.67$$

and this is within the range of 4.5 to 6.5.

The power $\phi_8$ of the condensing rearward surface of the negative meniscus $L_4$ is 2.014$\Phi$, and the power $\phi_9$ of the dispersing forward face of the meniscus $L_5$ is minus 1.640$\Phi$. The absolute values of these two powers thus lie between 1.33$\Phi$ and 3.33$\Phi$.

The curvature, or Gardner shape factors, $\sigma_L$ of the air gap may be calculated as follows:

$$\sigma_L = \frac{R_9+R_8}{R_9-R_8} = +5.60$$

and is thus within the range of 4.5 to 6.5. For reference to the "Gardner shape factor," attention is directed to "application of algebraic equations to optical design," Scientific Papers, Bureau of Standards, No. 550 (1927) by J. C. Gardner.

The difference, for the $d$-line, of the indices of refraction of the lenses $L_4$ and $L_5$, which may be expressed as $n_5-n_4$, is 0.0795 and thus lies between the values of 0.04 and 0.12. Also, the refractive index $n_5$ of the condensing meniscus lens $L_5$ is in excess of 1.72.

While a specific embodiment of the invention has been described in detail in order to illustrate the application of the principles of the invention, it should be understood that the invention may be embodied otherwise without departing from such principles.

What is claimed is:

1. A high intensity photographic tele-objective comprising a positive front member and a negative rear member separated by a relatively large axial air gap from said front member; said front member including an outer biconvex condensing lens followed rearwardly by a pair of adjacent but air-spaced dispersive lenses, and the equivalent focal length of said condensing lens being from 22.5% to 47.5% of the equivalent focal length of the entire tele-objective; said rear member including a negative meniscus and a positive meniscus rearwardly of said negative meniscus; said meniscuses enclosing a negative air lens acting as a condenser, and having their dispersing concave surfaces facing said front member; said rear member having a Gardner shape factor, defined as the quotient of the arithmetical sum and the arithmetical difference of the radii of its two outer surfaces, between 4.5 and 6.5; the powers of the facing surfaces of said two menisci respectively having absolute values between 1.33 and 3.33 times the equivalent total power of the objective; the shape factor of said air gap, defined as above, being between 4.5 and 6.5.

2. A high intensity photographic tele-objective, as claimed in claim 1, in which the difference between the refractive indices of said positive meniscus and said negative meniscus is between 0.04 and 0.12.

3. A high intensity photographic tele-objective, as claimed in claim 1, in which the refractive index of said positive meniscus is in excess of 1.72.

4. A high intensity photographic tele-objective, as claimed in claim 2, in which the refractive index of said positive meniscus is in excess of 1.72.

5. A high intensity photographic tele-objective, as claimed in claim 1, in which the axial thickness of said biconvex condensing lens is from 12 percent to 17 percent of the equivalent focal length of the entire objective.

6. A high intensity photographic tele-objective comprising a positive front member and a negative rear member separated by a relatively large axial air gap from said front member; said front member including an outer biconvex condensing lens followed rearwardly by a pair of adjacent dispersion lenses, and the equivalent focal length of said condensing lens being from 22.5% to 47.5% of the equivalent focal length of the entire tele-objective; said rear member including a negative meniscus and a positive meniscus rearwardly of said negative meniscus; said meniscuses enclosing a negative air lens acting as a condenser, and having their dispersing concave surfaces facing said front member; said tele-objective, having the following structural data for a focal length of $f$ equals 100 mm., and wherein the radii R may deviate by ±20%, the axial thicknesses $d$ of the lenses and the air gaps may deviate by ±0.05$f$, the surface powers $\phi$ of the lenses may deviate by ±20% from indicated values, $n$ equals the refractive indices of the several lenses, $\nu$ is the Abbe number of the respective lenses, and $\Phi$ is the total power of the objective:

|  |  | Refractive Index $n$ | Abbe Number $\nu$ | Power $\phi$ as factor of equivalent total power $\Phi$ |
|---|---|---|---|---|
| $R_1=+30.72$ mm. | $d_1=15.38$ mm. (cemented) | 1.6700 | 47.2 | $+2.181$ |
| $R_2=-103.96$ mm. | | | | $+0.645$ |
| $R_3=-103.96$ mm. | $d_2=1.65$ mm. | 1.7487 | 25.7 | $-0.755$ |
| $R_4=+261.61$ mm. | | | | $-0.300$ |
| $R_5=+803.87$ mm. | $a_1=0.57$ mm. $d_3=1.65$ mm. | 1.8052 | 25.5 | $+0.100$ |
| $R_6=+79.48$ mm. | | | | $-1.013$ |
| $R_7=-14.21$ mm. | $a_2=28.39$ mm. $d_4=0.91$ mm. | 1.6700 | 39.2 | $-4.716$ |
| $R_8=-31.85$ mm. | | | | $+2.103$ |
| $R_9=-45.70$ mm. | $a_3=0.11$ mm. $d_5=3.30$ mm. | 1.7495 | 35.0 | $-1.640$ |
| $R_{10}=-20.30$ mm. | | | | $+3.692$ |

References Cited by the Examiner

UNITED STATES PATENTS 2,413,476 12/46 Warmisham et al. ‑‑‑‑‑‑‑ 88—57
2,631,497 3/53 Schlegel ‑‑‑‑‑‑‑‑‑‑‑‑‑‑‑ 88—57
2,730,017 1/56 Tronnier ‑‑‑‑‑‑‑‑‑‑‑‑‑‑ 88—57

JEWELL H. PEDERSEN, *Primary Examiner.*

EMIL G. ANDERSON, *Examiner.*